United States Patent
Nakaishi (10) Patent No.: US 9,673,474 B2
(45) Date of Patent: Jun. 6, 2017

(54) BATTERY CELL STACK AND REDOX FLOW BATTERY

(71) Applicant: Sumitomo Electric Industries, Ltd., Osaka-shi (JP)

(72) Inventor: Hiroyuki Nakaishi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 14/913,861

(22) PCT Filed: Sep. 3, 2014

(86) PCT No.: PCT/JP2014/073124
§ 371 (c)(1),
(2) Date: Feb. 23, 2016

(87) PCT Pub. No.: WO2015/037482
PCT Pub. Date: Mar. 19, 2015

(65) Prior Publication Data
US 2016/0359188 A1    Dec. 8, 2016

(30) Foreign Application Priority Data

Sep. 12, 2013 (JP) ................. 2013-189506
Aug. 5, 2014 (JP) ................. 2014-159339

(51) Int. Cl.
*H01M 8/18* (2006.01)
*H01M 8/0206* (2016.01)
(Continued)

(52) U.S. Cl.
CPC ........ *H01M 8/188* (2013.01); *H01M 8/0206* (2013.01); *H01M 8/0228* (2013.01);
(Continued)

(58) Field of Classification Search
None
See application file for complete search history.

(56) References Cited

U.S. PATENT DOCUMENTS

2010/0075189 A1   3/2010  Cha et al.
2010/0291464 A1   11/2010 Abd Elhamid et al.

FOREIGN PATENT DOCUMENTS

JP    1-183071 A     7/1989
JP    2005-228617 A  8/2005
JP    2012-119288 A  6/2012

OTHER PUBLICATIONS

International Search Report in PCT International Application No. PCT/JP2014/073124, dated Dec. 9, 2014.
(Continued)

*Primary Examiner* — Patrick Ryan
*Assistant Examiner* — Christopher Domone
(74) *Attorney, Agent, or Firm* — Venable LLP; Michael A. Sartori; F. Brock Riggs (57) ABSTRACT

Provided is a battery cell stack in which the electrical resistance between a current collector plate and an end bipolar plate is unlikely to increase when charging and discharging are repeated. A battery cell stack includes a current collector plate electrically connected to each of a pair of end bipolar plates located at both ends in the stacking direction. In the battery cell stack, two members in contact with each other between the current collector plate and the end bipolar plate are made of materials such that, when an accelerated test satisfying the following conditions 1 to 3 is performed, the electrical resistance value between the current collector plate and the end bipolar plate after the accelerated test is 1.05 times or less the electrical resistance value between the current collector plate and the end bipolar plate before the accelerated test:

(Continued)

Condition 1 is that a cycle includes applying pressure over one minute to achieve a predetermined pressure, maintaining the predetermined pressure for one minute, and bringing the predetermined pressure back to the atmospheric pressure over one minute;

Condition 2 is that the predetermined pressure is set to be the atmospheric pressure +0.1 MPa; and Condition 3 is that the number of cycles is set to 18.

12 Claims, 7 Drawing Sheets

(51) Int. Cl.
    *H01M 8/0228*    (2016.01)
    *H01M 8/20*    (2006.01)
    *H01M 8/2465*    (2016.01)
    *H01M 10/42*    (2006.01)

(52) U.S. Cl.
    CPC ........... *H01M 8/20* (2013.01); *H01M 8/2465* (2013.01); *H01M 10/4285* (2013.01); *Y02E 60/528* (2013.01)

(56) References Cited

OTHER PUBLICATIONS

Extended European Search Report in European Patent Application No. 14844242.9, dated Jul. 22, 2016.

BATTERY CELL STACK AND REDOX FLOW BATTERY

TECHNICAL FIELD

The present invention relates to a battery cell stack in which a plurality of bipolar plates and a plurality of cells are stacked, and a redox flow battery using the battery cell stack.

BACKGROUND ART

Figure 6:
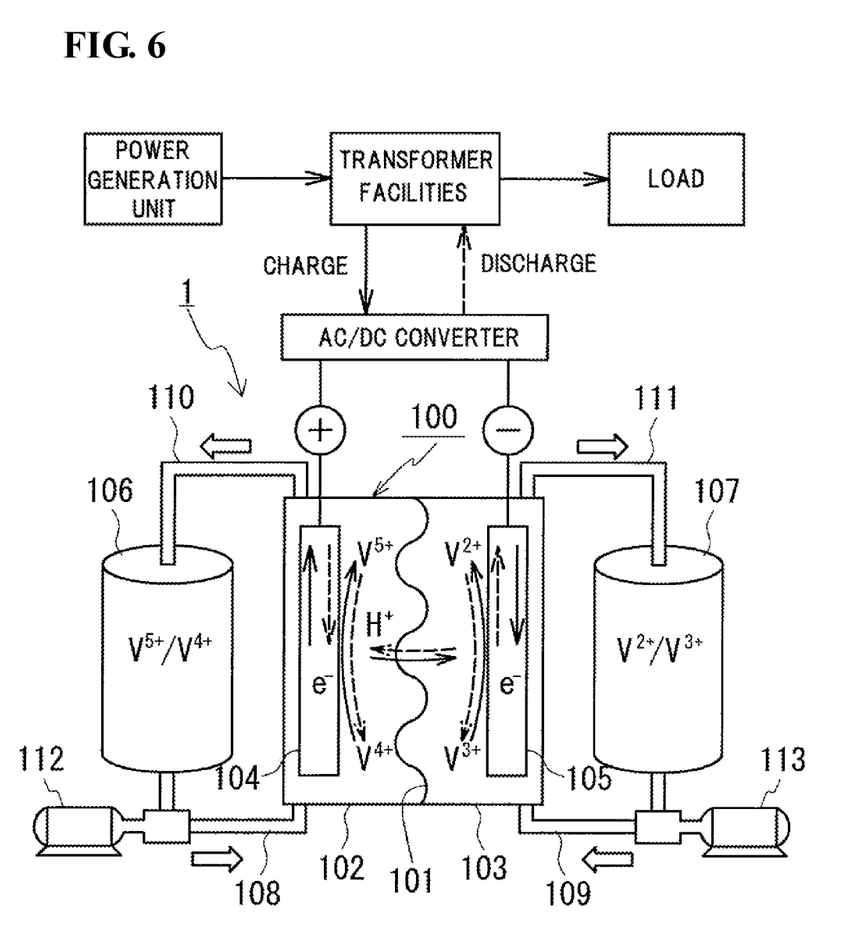
FIG. 6 is an operating principle diagram of a redox flow battery.

A redox flow battery (RF battery) is a large-capacity storage battery that stores new energy obtained by solar power generation, wind power generation, or the like. The RF battery performs charging and discharging using the difference in oxidation reduction potential between ions contained in a positive electrode electrolyte and ions contained in a negative electrode electrolyte. As shown in an operating principle diagram of FIG. 6 for an RF battery 1, the RF battery 1 includes a cell 100 which is separated into a positive electrode cell 102 and a negative electrode cell 103 by a membrane 101 across which hydrogen ions are transported. The positive electrode cell 102 contains a positive electrode 104 and is connected via ducts 108 and 110 to a positive electrode electrolyte tank 106 that stores a positive electrode electrolyte. Similarly, the negative electrode cell 103 contains a negative electrode 105 and is connected via ducts 109 and 111 to a negative electrode electrolyte tank 107 that stores a negative electrode electrolyte. The electrolytes stored in the tanks 106 and 107 are circulated within the cells 102 and 103 by pumps 112 and 113 during charging and discharging. In the case where charging and discharging are not performed, the pumps 112 and 113 are stopped, and the electrolytes are not circulated.

Figure 7:
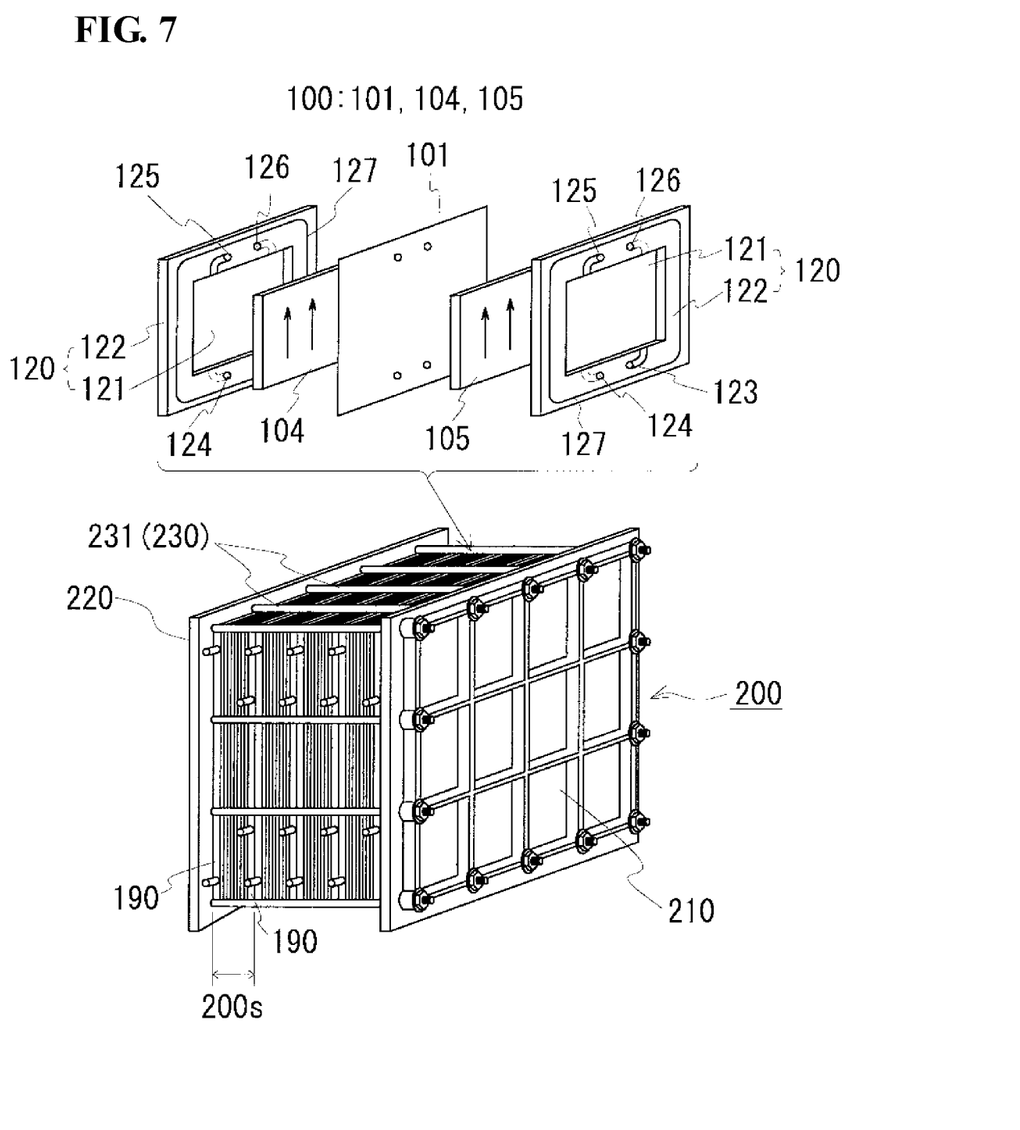
FIG. 7 is a schematic diagram of an existing battery cell stack.

The cell 100 is usually formed inside a structure referred to as a battery cell stack 200 shown in FIG. 7. The battery cell stack 200 is configured such that a layered structure referred to as a sub-stack 200s is sandwiched between two end plates 210 and 220 and fastened with a fastening mechanism 230 (in the configuration shown in the drawing, a plurality of sub-stacks 200s are used). As shown in the upper portion of FIG. 7, the sub-stack 200s has a configuration in which a cell frame 120 including a bipolar plate 121 integrated into a frame 122 shaped like a picture frame, a positive electrode 104, a membrane 101, and a negative electrode 105 are stacked in this order, and the resulting stacked body is sandwiched between supply/discharge plates 190 (refer to the lower portion of FIG. 7). In this configuration, a battery cell 100 is formed between the bipolar plates 121 of the adjacent cell frames 120.

In the sub-stack 200s, circulation of the electrolytes into the cell 100 through the supply/discharge plates 190 is performed by using liquid supply manifolds 123 and 124 and liquid discharge manifolds 125 and 126 which are provided on the frame 122. The positive electrode electrolyte is supplied from the liquid supply manifold 123 through a channel formed on one surface side (front side of the sheet) of the frame 122 to the positive electrode 104, and is discharged through a channel formed on the upper part of the frame 122 to the liquid discharge manifold 125. Similarly, the negative electrode electrolyte is supplied from the liquid supply manifold 124 through a channel formed on the other surface side (back side of the sheet) of the frame 122 to the negative electrode 105, and is discharged through a channel formed on the upper part of the frame 122 to the liquid discharge manifold 126. Ring-shaped sealing members 127, such as O-rings and flat packing, are disposed between the individual cell frames 120 so that leakage of the electrolytes from the sub-stack 200s can be prevented.

The input and output of electric power between the battery cell 100 provided in the sub-stack 200s and an external device are performed by a current-collecting structure using current collector plates composed of an electrically conductive material. A pair of current collector plates are provided for each sub-stack 200s. The current collector plates are electrically connected to the corresponding bipolar plates (hereinafter, referred to as the end bipolar plates) 121 of cell frames 120 located at both ends in the stacking direction among a plurality of cell frames 120 stacked.

In the RF battery, the electrolytes are circulated during charging and discharging. However, circulation of the electrolytes is stopped when charging and discharging are not performed. Accordingly, the pressure in the battery cell 100 changes, and in some cases, the electrical connection between the current collector plate and the end bipolar plate 121 may become insufficient because of the change in pressure. As a technique that overcomes this problem, for example, Patent Literature 1 discloses a technique in which a cushion layer (cushion member) which is deformable in the thickness direction is provided between a current collector plate and an end bipolar plate 121, and a metal layer is disposed on the cushion member side surface of the end bipolar plate 121. Patent Literature 1 describes that preferably, a tin-plated copper mesh is used as the cushion member, and the metal layer is formed by thermal spraying of tin.

CITATION LIST

Patent Literature

PTL 1: Japanese Unexamined Patent Application Publication No. 2012-119288

SUMMARY OF INVENTION

Technical Problem

However, even in the battery using the battery cell stack provided with the cushion member described above, in some cases, the electrical resistance between the current collector plate and the end bipolar plate increases as charging and discharging are repeated, degrading the battery performance.

The present invention has been achieved under the circumstances described above. It is an object of the present invention to provide a battery cell stack which can suppress an increase in the electrical resistance between a current collector plate and an end bipolar plate due to repeated charging and discharging. It is another object of the present invention to provide a redox flow battery using the battery cell stack.

Solution to Problem

A battery cell stack according to an embodiment of the present invention includes a plurality of stacked bipolar plates, battery cells placed between the individual bipolar plates, and a current collector plate electrically connected to each of a pair of end bipolar plates located at both ends in the stacking direction among the plurality of bipolar plates. In the battery cell stack, two members in contact with each other between the current collector plate and the end bipolar plate are made of materials such that, when an accelerated test satisfying the following conditions 1 to 3 is performed, the electrical resistance value between the current collector plate and the end bipolar plate after the accelerated test is 1.05 times or less the electrical resistance value between the current collector plate and the end bipolar plate before the accelerated test:

Condition 1 is that a cycle includes applying pressure over one minute to achieve a predetermined pressure, maintaining the predetermined pressure for one minute, and bringing the predetermined pressure back to the atmospheric pressure over one minute;

Condition 2 is that the predetermined pressure is set to be the atmospheric pressure +0.1 MPa; and Condition 3 is that the number of cycles is set to 18.

Advantageous Effects of Invention

In the cell stack, even when charging and discharging are repeated, the resistance between the current collector plate and the end bipolar plate is unlikely to increase.

DESCRIPTION OF EMBODIMENTS

[Description of Embodiments of the Present Invention]

First, contents of embodiments of the present invention are enumerated and described.

First, in the development process of battery cell stacks according to the embodiments, the present inventor has investigated the reason for the increase in the resistance between the current collector plate and the end bipolar plate in the battery cell stack of the existing type.

As a result, it has been found that this is caused by entry of water from the outside environment into the battery cell stack due to repeated charging and discharging. In particular, in an RF battery, it has been found that when circulation of electrolytes is stopped and the pressure in the battery cell stack of the existing type is decreased, water is likely to enter the inside of the battery cell stack of the existing type from the outside environment. In the battery cell stack of the existing type, a copper plate is used as the current collector plate, a copper foil or a tin-plated copper mesh is used as the cushion member, and the contact portion between the current collector plate and the cushion member is a dissimilar metal contact portion. Therefore, when water enters the dissimilar metal contact portion, electrolytic corrosion (galvanic corrosion) occurs. The electrolytic corrosion portion is believed to be one factor leading to an increase in the electrical resistance between the current collector plate and the end bipolar plate.

In order to solve the problem described above, it is conceivable to enhance adhesion between members stacked in the battery cell stack, i.e., to increase the air blocking property of the battery cell stack so that it is possible to suppress entry of water into the vicinity of the current collector plate. However, there is a limit in enhancing adhesion between members, and the members may be deteriorated or deformed by repeated charging and discharging. On the basis of this point, the present inventor has competed battery cell stacks according to the embodiments.

<1> A battery cell stack according to an embodiment includes a plurality of stacked bipolar plates, battery cells placed between the individual bipolar plates, and a current collector plate electrically connected to each of a pair of end bipolar plates located at both ends in the stacking direction among the plurality of bipolar plates. In the battery cell stack, two members in contact with each other between the current collector plate and the end bipolar plate are made of materials such that, when an accelerated test satisfying the following conditions 1 to 3 is performed, the electrical resistance value between the current collector plate and the end bipolar plate after the accelerated test is 1.05 times or less the electrical resistance value between the current collector plate and the end bipolar plate before the accelerated test:

Condition 1 is that a cycle includes applying pressure over one minute to achieve a predetermined pressure, maintaining the predetermined pressure for one minute, and bringing the predetermined pressure back to the atmospheric pressure over one minute;

Condition 2 is that the predetermined pressure is set to be the atmospheric pressure +0.1 MPa; and Condition 3 is that the number of cycles is set to 18.

Regarding the battery cell stack in which it has been confirmed, by an accelerated test simulating repetition of charging and discharging, that the electrical resistance value between the current collector plate and the end bipolar plate is unlikely to increase, when the battery cell stack is used for a flow battery (typically, a redox flow battery), it is possible to suppress degradation of the performance of the flow battery due to repeated charging and discharging.

<2> In the battery cell stack according to the embodiment, the corrosion potential difference between any two members in contact with each other between the current collector plate and the end bipolar plate may be 0.35 V or less.

Here, in the case where the current collector plate and the end bipolar plate are in direct contact with each other, the "corrosion potential difference between any two members in contact with each other between the current collector plate and the end bipolar plate" refers to the corrosion potential difference between the current collector plate and the end bipolar plate. In the case where a cushion member is provided between the current collector plate and the end bipolar plate, the "corrosion potential difference" refers to both the corrosion potential difference between the current collector plate and the cushion member and the corrosion potential difference between the cushion member and the end bipolar plate. That is, in the battery cell stack provided with a cushion member, both the corrosion potential difference between the current collector plate and the cushion member and the corrosion potential difference between the cushion member and the end bipolar plate are 0.35 V or less. Furthermore, in the case where a plurality of cushion members are present, the corrosion potential difference between the individual cushion members is also 0.35 V or less.

The "corrosion potential difference between any two members in contact with each other" means the potential difference between the potential of one material and the potential of another material in artificial seawater (JIS Z 0103 1057). The potential of each material is a potential relative to the standard hydrogen electrode. The galvanic series in artificial seawater for typical materials that can be used in battery cell stacks is exemplified below. It would be desirable to select materials constituting the individual members from the materials exemplified below such that the properties (mechanical strength, presence or absence and magnitude of electrical conductivity, and the like) required for the individual members of the battery cell stack are satisfied, and the corrosion potential difference between any two members is 0.35 V or less. Of course, the materials to be used are not limited to those exemplified below.

| | |
|---|---|
| Chromium | about −0.91 V to about −0.74 V |
| Aluminum 1100 | about −0.74 V to about −0.72 V |
| Tin | about −0.58 V |
| Nickel | about −0.22 V to about −0.17 V |
| Copper 110 | about −0.22 V |
| Silver | about −0.18 V to about −0.14 V |
| Titanium 2 | about −0.18 V to about −0.16 V |
| Stainless steel 304 | about −0.17 V to about −0.12 V |
| Gold | about 0.08 V to about 0.12 V |
| Platinum | about 0.18 V to about 0.24 V |
| Graphite (carbon material) | about 0.26 V to about 0.32 V |

As in the configuration described above, by reducing the corrosion potential difference between any two members in contact with each other between the current collector plate and the end bipolar plate to 0.35 V or less, it is possible to make electrolytic corrosion unlikely to occur between the current collector plate and the end bipolar plate. That is, in accordance with the configuration described above, by making electrolytic corrosion unlikely to occur between the current collector plate and the end bipolar plate, it is possible to suppress an increase in the electrical resistance value between the current collector plate and the end bipolar plate due to electrolytic corrosion portions.

<3> In the battery cell stack according to the embodiment, the current collector plate may be provided with a current collector plate covering layer formed on a portion of the surface thereof facing the end bipolar plate, and the end bipolar plate may be provided with a bipolar plate covering layer formed on a portion of the surface thereof facing the current collector plate. In this case, the current collector plate covering layer and the bipolar plate covering layer are made of materials such that the corrosion potential difference between the two covering layers is 0.35 V or less, and the current collector plate and the end bipolar plate are in contact with each other with their respective covering layers therebetween.

In the configuration in which each of the current collector plate and the end bipolar plate is provided with a covering layer, and the current collector plate to be electrically connected to the end bipolar plate is brought into contact with the bipolar plate with the two covering layers therebetween, regardless of the materials of the current collector plate and the end bipolar plate, the corrosion potential difference between the current collector plate and the end bipolar plate (i.e., the corrosion potential difference between the covering layers formed on the two plates) can be set to 0.35 V or less.

Since the covering layers adhere closely to their respective plates, there are no openings, through which water enters, between the current collector plate and the current collector plate covering layer and between the end bipolar plate and the bipolar plate covering layer. Therefore, electrolytic corrosion does not substantially occur between the plates and their respective layers.

<4> In the battery cell stack in which the current collector plate and the end bipolar plate are in contact with each other, the current collector plate covering layer may be a tin or tin alloy layer, and the bipolar plate covering layer may be a tin or tin alloy layer.

When the two covering layers are made of tin or a tin alloy, the corrosion potential difference between the current collector plate and the end bipolar plate (i.e., the corrosion potential difference between the covering layers formed on the individual plates) can be reduced to a very low value. In particular, when the two covering layers are made of the same material, the corrosion potential difference between the current collector plate and the end bipolar plate can be set to substantially 0 V. Furthermore, from the viewpoint of excellent electrical conductivity and low melting point, tin is suitable for the covering layers of the individual plates. In particular, the end bipolar plate is generally made of plastic containing a carbon material (the same applies to the bipolar plates other than the end bipolar plate), and by using tin with a low melting point, the bipolar plate covering layer can be formed without damaging the end bipolar plate.

<5> In the battery cell stack according to the embodiment, the battery cell stack may further include an electrically conductive cushion member which is disposed between and in contact with the current collector plate and the end bipolar plate, and the cushion member may be at least one selected from the group consisting of a mesh, a foil, and a felt made of a material such that the corrosion potential difference between the cushion member and the end bipolar plate is 0.35 V or less. In this case, the current collector plate is provided with a current collector plate covering layer formed on a portion of the surface thereof facing the cushion member, the current collector plate covering layer is made of a material such that the corrosion potential difference between the current collector plate covering layer and the cushion member is 0.35 V or less, and the current collector plate and the cushion member is in contact with each other with the current collector plate covering layer therebetween.

The cushion member which is a mesh, a foil, or a felt has deformability. Therefore, even if the pressure inside the battery cell stack is changed, the electrical connection of the current collector plate to the end bipolar plate is likely to be secured. The reason for this is that even if the distance between the current collector plate and the end bipolar plate is increased by a change in the inside pressure, the electrically conductive cushion member having deformability secures electrical connection between the end bipolar plate and the current collector plate.

Furthermore, in the configuration described above, the material for the cushion member is selected in accordance with the material for the end bipolar plate such that the corrosion potential difference between the cushion member and the end bipolar plate is 0.35 V or less, and the material for the current collector plate covering layer is selected in accordance with the material for the cushion member such that the corrosion potential difference between the cushion member and the current collector plate covering layer is 0.35 V or less. Consequently, the corrosion potential difference between any two members between the current collector plate and the end bipolar plate can be set to 0.35 V or less.

<6> In the battery cell stack including the cushion member, the cushion member may contain a carbon material as an electrically conductive material, and the current collector plate covering layer may be a carbon material layer.

Examples of the carbon material include graphite, carbon black, and electrically conductive diamond-like carbon. By using the configuration described above, the corrosion potential difference between the current collector plate and the cushion member (i.e., the corrosion potential difference between the current collector plate covering layer and the cushion member) can be set to substantially 0 V. Furthermore, since the cushion member contains a carbon material as a major component, the corrosion potential difference between the end bipolar plate, which often contains a carbon material as an electrically conductive material, and the cushion member can be brought close to 0 V.

<7> In the battery cell stack according to the embodiment, the corrosion potential difference between the current collector plate and a member in contact with the current collector plate between the current collector plate and the end bipolar plate may be 0.45 to 0.55 V.

In the case where the corrosion potential difference between two members in contact with each other is large, electrolytic corrosion is likely to occur between the two members, and therefore, from a common-sense viewpoint, the electrical resistance value between the current collector plate and the end bipolar plate is likely to increase. However, the study by the present inventor has shown that, when the corrosion potential difference between the current collector plate and a member in contact with the current collector plate is 0.45 to 0.55 V, although electrolytic corrosion occurs between two members in contact with each other, the electrical resistance value between the current collector plate and the end bipolar plate is unlikely to increase. Hereinafter, such a battery cell stack may be referred to as the electrolytic corrosion-permitting battery cell stack in some cases.

<8> In the electrolytic corrosion-permitting battery cell stack, the current collector plate and the end bipolar plate may be in direct contact with each other. In this case, the current collector plate and the end bipolar plate are made of materials such that the corrosion potential difference therebetween is 0.45 to 0.55 V.

In the configuration described above, a cushion member is not provided between the current collector plate and the end bipolar plate, and covering layers are not formed on the current collector plate and the end bipolar plate. Therefore, the configuration is excellent in terms of productivity.

<9> In the electrolytic corrosion-permitting battery cell stack in which the current collector plate and the end bipolar plate are in direct contact with each other, the current collector plate may be made of nickel, a nickel alloy, copper, a copper alloy, silver, a silver alloy, titanium, a titanium alloy, or stainless steel.

The elements or alloys described above have predetermined electrical conductivity, and therefore are preferable as materials for the current collector plate.

<10> In the electrolytic corrosion-permitting battery cell stack, the battery cell stack may further include an electrically conductive cushion member which is disposed between and in contact with the current collector plate and the end bipolar plate, the cushion member being composed of at least one selected from the group consisting of a mesh, a foil, and a felt. In this case, the current collector plate and the cushion member are made of materials such that the corrosion potential difference therebetween is 0.45 to 0.55 V.

By using the cushion member composed of a mesh, a foil, or a felt and having deformability, the electrical connection of the current collector plate to the end bipolar plate is likely to be secured. The reason for this is that even if the distance between the current collector plate and the end bipolar plate is increased by a change in the inside pressure, the electrically conductive cushion member having deformability secures electrical connection between the end bipolar plate and the current collector plate.

<11> In the electrolytic corrosion-permitting battery cell stack including the cushion member, the current collector plate may be made of nickel, a nickel alloy, copper, a copper alloy, silver, a silver alloy, titanium, a titanium alloy, or stainless steel.

The elements or alloys described above have predetermined electrical conductivity, and therefore are preferable as materials for the current collector plate.

<12> A redox flow battery according to an embodiment includes the battery cell stack according to the embodiment described above, a positive electrode circulation mechanism which circulates a positive electrode electrolyte to the battery cell stack, and a negative electrode circulation mechanism which circulates a negative electrode electrolyte to the battery cell stack.

A redox flow battery is a battery in which charging and discharging are performed by repeating circulation/non-circulation of electrolytes, and the pressure inside the battery cell stack provided in the redox flow battery changes through the operation of the battery. There is a high possibility that water in the air may enter the inside of the battery cell stack (in particular, in the vicinity of current collector plates) as a result of change in the inside pressure. In the battery cell stack provided in the redox flow battery according to the embodiment, as described above, the electrical resistance value between the current collector plate and the end bipolar plate is unlikely to increase even when charging and discharging are repeated. Therefore, in the redox flow battery using this battery cell stack, the performance is unlikely to be degraded even when charging and discharging are repeated.

[Detailed Description of Embodiments of the Present Invention]

Redox flow batteries (RF batteries) according to the embodiments will be described below. It is intended that the present invention is not limited to the configurations shown in the embodiments, but is determined by appended claims, and includes all variations of the equivalent meanings and ranges to the claims.

Embodiment 1-1

An RF battery according to this embodiment is characterized by a portion of a battery cell stack provided in the RF battery. Other than this, the configuration is the same as that of the RF battery 1 of the existing type described with reference to FIG. 6. The RF battery includes a positive electrode circulation mechanism which includes a pump 112, ducts 108 and 110, and a tank 106 for circulating a positive electrode electrolyte to the battery cell stack, and a negative electrode circulation mechanism which includes a pump 113, ducts 109 and 111, and a tank 107 for circulating a negative electrode electrolyte to the battery cell sack.

Accordingly, in this embodiment, a description will be made focusing on differences from the battery cell stack of the existing type. The same components as those of the existing type are designated by the same reference signs as those in FIGS. 6 and 7, and a description thereof will be omitted.

<<Cell Stack>>

A battery cell stack 2 shown in FIG. 1 includes, as in the existing battery cell stack 200 described with reference to FIG. 7, a stacked body in which cells 100, each including a positive electrode 104, a membrane 101, and a negative electrode 105, and cell frames 120 are alternately stacked. Current collector plates 10 for inputting and outputting electricity between a plurality of cells 100 and an external device are placed on both sides of the stacked body, and furthermore, supply/discharge plates 190 and end plates 210 and 220 are provided outside thereof. The stacked body, the current collector plates 10, the supply/discharge plates 190, and the end plates 210 and 220 are fastened with a fastening mechanism 230, thus constituting the battery cell stack 2. The fastening mechanism 230, for example, includes a fastening shaft 231, nuts 232 and 233 screwed onto both ends of the fastening shaft 231, and a compression spring 234 interposed between the nut 232 and the end plate 210.

There are two major differences between the battery cell stack 2 and the existing type.

1. A current collector plate covering layer 10s is formed on a current collector plate 10 which performs input and output of electricity between the battery cell stack 2 and an external device, and a bipolar plate covering layer 11s is formed on each of end bipolar plates 11b located at both ends in the stacking direction among a plurality of stacked bipolar plates 121 (refer to a portion surrounded by a circle in the drawing).

2. The materials for the current collector plate covering layer 10s and the bipolar plate covering layer 11s are selected such that the corrosion potential difference between the covering layers 10s and 11s is 0.35 V or less.

The configurations of the current collector plate 10 including the current collector plate covering layer 10s and the end bipolar plate 11b including the bipolar plate covering layer 11s will be described in detail below, and then, mention will be made of selection of materials for the covering layers 10s and 11s.

[Current Collector Plate]

The current collector plate 10 is an electrically conductive member which performs input and output of electricity between an external device and cells 100 through the end bipolar plate 11b. The current collector plate 10 is provided with a terminal (not shown) for connection to an external device, such as an inverter. The current collector plate 10 is preferably made of a metal material having high electrical conductivity, specifically, such as copper or a copper alloy. In addition, the current collector plate 10 may be made of gold, silver, iron, nickel, chromium, tin, aluminum, titanium, or an alloy containing any of these elements as a major component. It is preferable to use copper for a current collector plate 10 that requires high electrical conductivity and high strength.

[[Current Collector Plate Covering Layer]]

The current collector plate 10 is provided with a current collector plate covering layer 10s formed on a portion of the surface thereof facing the end bipolar plate 11b (refer to a portion surrounded by a circle in the drawing). The current collector plate covering layer 10s is an electrically conductive layer for setting the corrosion potential difference between the current collector plate 10 and the end bipolar plate 11b to 0.35 V or less. This will be described later.

As the material for the current collector plate covering layer 10s, a material having excellent electrical conductivity is used. For example, the material may be selected from gold, silver, copper, iron, nickel, chromium, tin, aluminum, titanium, and an alloy containing any of these elements as a major component. Alternatively, the current collector plate covering layer 10s may be made of a carbon material, such as graphite, carbon black, or diamond-like carbon. However, these materials are listed, focusing on electrical conductivity, and in the battery cell stack 2 according to this embodiment, the material cannot be selected regardless of the material for the bipolar plate covering layer 11s which will be described later. A detailed description will be made in the section titled "Material selection for current collector plate covering layer and bipolar plate covering layer".

The thickness of the current collector plate covering layer 10s is preferably 0.1 to 1,000 μm, and more preferably 10 to 100 μm. When the thickness is 0.1 μm or more, electrical connection with the current collector plate 10 is likely to be secured. On the other hand, when the thickness is 1,000 μm or less, peeling and fracture of the current collector plate covering layer 10s are unlikely to occur, against changes in pressure in the battery cell stack 2 due to repeated charging and discharging of the battery, the inward pressure due to fastening of the end plates 210 and 220, and the repulsive force caused as reaction to the inward pressure.

As the method for forming the current collector plate covering layer 10s, a method is preferable in which a current collector plate covering layer 10s adhering to the current collector plate 10 can be formed. For example, the current collector plate covering layer 10s can be formed by an electroplating method, a non-electrolytic plating method, a thermal spraying method, sputtering, or a vacuum deposition method. By using these methods, the electrically conductive material of the current collector plate 10 and the current collector plate covering layer 10s can be made to adhere strongly to each other, and the current collector plate covering layer 10s does not peel off from the current collector plate 10 during repeated charging and discharging of the battery, thus ensuring the electrical connection between the two over a long period of time. In particular, in the case where the current collector plate covering layer 10s is formed by a plating method, the adhesion between the current collector plate 10 and the current collector plate covering layer 10s is high, which is preferable.

[End Bipolar Plate]

The end bipolar plates 11b are, as has been already described, bipolar plates 121 located at both ends in the stacking direction among a plurality of stacked bipolar plates 121. Each of the end bipolar plates 11b is a member electrically connected to the current collector plate 10. That is, the end bipolar plate 11b is generally used in the form of an end cell frame 11 fixed inside a frame 11f made of plastic. A surface (on the right side of the sheet) of an end bipolar plate 11b located on the left side of the sheet is in contact with a positive electrode 104 constituting a cell 100, and a surface (on the left side of the sheet) of the end bipolar plate 11b is in contact with and electrically connected to a current collector plate 10 located on the left side of the sheet. Furthermore, a surface (on the left side of the sheet) of an end bipolar plate 11b located on the right side of the sheet is in contact with a negative electrode 105 constituting a cell 100, and a surface (on the right side of the sheet) of the end bipolar plate 11b is in contact with and electrically connected to a current collector plate 10 located on the right side of the sheet.

The material for the end bipolar plate 11b preferably has excellent electrical conductivity, and more preferably has acid resistance and flexibility. For example, the end bipolar plate 11b is made of an electrically conductive material containing a carbon material, and specific examples thereof include a conductive plastic composed of graphite and a chlorinated organic compound. In the conductive plastic, part of graphite may be replaced with at least one of carbon black and diamond-like carbon. Examples of the chlorinated organic compound include vinyl chloride, chlorinated polyethylene, and chlorinated paraffin. By using such a material, it is possible to obtain an end bipolar plate 11b having low electrical resistance and excellent acid resistance and flexibility.

[[Bipolar Plate Covering Layer]]

The end bipolar plate 11b is provided with a bipolar plate covering layer 11s formed on a portion of the surface thereof facing the current collector plate 10 (refer to a portion surrounded by a circle in the drawing). The bipolar plate covering layer 11s is an electrically conductive layer for setting the corrosion potential difference between the current collector plate 10 and the end bipolar plate 11b to 0.35 V or less. This will be described later.

As the material for the bipolar plate covering layer 11s, for example, gold, silver, copper, iron, nickel, chromium, tin, aluminum, titanium, or an alloy containing any of these elements as a major component may be selected. However, when selecting the material, it is necessary to take the material for the metal layer covering layer 10s into consideration, as will be described later.

The thickness of the bipolar plate covering layer 11s is preferably 0.1 to 1,000 μm, and more preferably 10 to 100 μm. When the thickness is 0.1 μm or more, electrical connection with the bipolar plate 11b is likely to be secured. On the other hand, when the thickness is 1,000 μm or less, peeling and fracture of the bipolar plate covering layer 11s are unlikely to occur, against repeated charging and discharging of the battery, the inward pressure due to fastening of the end plates 210 and 220, and the repulsive force caused as reaction to the inward pressure.

As the method for forming the bipolar plate covering layer 11s, a method is preferable in which a bipolar plate covering layer 11s adhering to the end bipolar plate 11b can be formed. For example, the bipolar plate covering layer 11s can be formed by an electroplating method, a non-electrolytic plating method, a thermal spraying method, sputtering, or a vacuum deposition method. By using these methods, the electrically conductive material of the end bipolar plate 11b and the bipolar plate covering layer 11s can be made to adhere strongly to each other, and the bipolar plate covering layer 11s does not peel off from the end bipolar plate 11b during repeated charging and discharging of the battery, thus ensuring the electrical connection between the two over a long period of time. In particular, when the bipolar plate covering layer 11s is formed by a thermal spraying method, the electrically conductive material, such as graphite or carbon black, contained in the end bipolar plate 11b, among the components of the end bipolar plate 11b, is more likely to adhere to the bipolar plate covering layer 11s, which is advantageous. Furthermore, since the thermal spraying method is suitable for forming a covering layer on a portion of a member, it is appropriate to use the thermal spraying method for forming the bipolar plate covering layer 11s which is formed only on one surface of the end bipolar plate 11b.

[Material Selection for Current Collector Plate Covering Layer and Bipolar Plate Covering Layer]

The material for the current collector plate covering layer 10s and the material for the bipolar plate covering layer 11s are selected such that the corrosion potential difference between the two covering layers 10s and 11s is 0.35 V or less, preferably 0.3 V or less, more preferably 0.2 V or less, and most preferably 0 V. The corrosion potential difference means the potential difference between the potential of one material and the potential of another material in artificial seawater. The potentials relative to the standard hydrogen electrode in artificial seawater are exemplified below.

| | |
|---|---|
| Chromium | about −0.91 V to about −0.74 V |
| Aluminum 1100 | about −0.74 V to about −0.72 V |
| Tin | about −0.58 V |
| Nickel | about −0.22 V to about −0.17 V |
| Copper 110 | about −0.22 V |
| Silver | about −0.18 V to about −0.14 V |
| Titanium 2 | about −0.18 V to about −0.16 V |
| Stainless steel 304 | about −0.17 V to about −0.12 V |
| Gold | about 0.08 V to about 0.12 V |
| Platinum | about 0.18 V to about 0.24 V |

Graphite (carbon material) about 0.26 V to about 0.32 V

When the same material is selected for the material for the current collector plate covering layer 10s and the material for the bipolar plate covering layer 11s, the corrosion potential difference between the two covering layers 10s and 11s can be set to substantially 0 V. In particular, it is preferable to select tin as the material for both the current collector plate covering layer 10s and the bipolar plate covering layer 11s. Tin has excellent electrical conductivity and can satisfactorily maintain the electrical connection between the current collector plate 10 and the end bipolar plate 11b.

In the case where the covering layers 10s and 11s are made of tin, in consideration of ease of formation and high adhesion, preferably, the current collector plate covering layer 10s is formed by plating, and the bipolar plate covering layer 11s is formed by thermal spraying. Since tin has a low melting point, the bipolar plate covering layer 11s can be formed without damaging the end bipolar plate 11b which contains a plastic.

Of course, the material for the current collector plate covering layer 10s may be different from the material for the bipolar plate covering layer 11s (the corrosion potential difference between the two covering layers 10s and 11s being 0.35 V or less). For example, the covering layers 10s and 11s may be formed using gold and silver, nickel and silver, or the like.

[Advantages]

In the battery cell stack 2 described above, even when water enters the space between the current collector plate 10 and the end bipolar plate 11b from the outside environment, electrolytic corrosion is unlikely to occur in the current collector plate 10 and the end bipolar plate 11b. The reason for this is that the corrosion potential difference between the current collector plate covering layer 10s formed on the current collector plate 10 and the bipolar plate covering layer 11s formed on the end bipolar plate 11b is 0.35 V or less. In particular, in the case where both layers 10s and 11s are made of tin, it is possible to substantially avoid the occurrence of electrolytic corrosion.

Furthermore, in the battery cell stack 2, since electrolytic corrosion is unlikely to occur between the current collector plate 10 and the end bipolar plate 11b, an increase in the electrical resistance value between the current collector plate 10 and the end bipolar plate 11b due to electrolytic corrosion is unlikely to occur. For example, when an accelerated test satisfying the conditions 1 to 3 described below is performed using the battery cell stack 2, the electrical resistance value between the current collector plate 10 and the end bipolar plate 11b after the accelerated test can be reduced to 1.05 times or less the electrical resistance value between the current collector plate 10 and the end bipolar plate 11b before the accelerated test. That is, before and after the accelerated test, the rate of increase in the electrical resistance value between the two plates 10 and 11b can be reduced to 5% or less. In such a battery cell stack 2, it is possible to suppress degradation of the performance of the RF battery due to repeated charging and discharging.

Condition 1 is that a cycle includes applying pressure over one minute to achieve a predetermined pressure, maintaining the predetermined pressure for one minute, and bringing the predetermined pressure back to the atmospheric pressure over one minute;

Condition 2 is that the predetermined pressure is set to be the atmospheric pressure +0.1 MPa; and Condition 3 is that the number of cycles is set to 18.

Embodiment 1-2

In Embodiment 1-2, a battery cell stack 3 in which a cushion member 12 is further provided between a current collector plate 10 and an end bipolar plate 11b will be described with reference to FIG. 2.

<<Battery Cell Stack>>

The battery cell stack 3 according to this embodiment differs from the battery cell stack 2 according to Embodiment 1 on the following points:

A cushion member 12 is provided.

A bipolar plate covering layer is not formed on the surface of the end bipolar plate 11b. (Note that a current collector plate covering layer 10s is formed on the surface of the current collector plate 10.)

Furthermore, in the battery cell stack 3, the materials for the cushion member 12 and the current collector plate covering layer 10s are selected such that the corrosion potential difference between the cushion member 12 and the current collector plate covering layer 10s is 0.35 V or less, and the materials for the cushion member 12 and the end bipolar plate 11b are selected such that the corrosion potential difference between the cushion member 12 and the end bipolar plate 11b is 0.35 V or less. The structure of the cushion member including the material will be described below, and then, mention will be made of selection of materials for the cushion member 12 and the end bipolar plate 11b.

[Cushion Member]

The cushion member 12 is a member for satisfactorily maintaining electrical connection between the current collector plate 10 and the end bipolar plate 11b even when the pressure in the battery cell stack 3 changes, and is disposed between the current collector plate 10 and the end bipolar plate 11b.

The cushion member 12 has deformability so that the electrical connection between the current collector plate 10 and the end bipolar plate 11b can be satisfactorily maintained. The term "deformability" refers to having an elastic property of deforming following the movement of the current collector plate 10 and the end bipolar plate 11b such that the cushion member 12 is in contact with both the current collector plate 10 and the end bipolar plate 11b even when the pressure inside the cell 100 becomes a negative pressure. Herein, the negative pressure is about −0.02 MPa (≈0.08 MPa) on the basis (0) of the atmospheric pressure (≈0.1 MPa).

The form of the cushion member 12 is, for example, preferably a mesh, a foil, or a felt. Since the mesh, foil, or felt has elasticity with respect to compression in the thickness direction, the deformability is provided. Two or more of a mesh, a foil, and a felt may be combined to form a cushion member 12.

Preferably, the cushion member 12 contains a carbon material as an electrically conductive material. The reason for this is that, in this embodiment, the cushion member 12 is configured to be in direct contact with the end bipolar plate 11b. As has been already described, the end bipolar plate 11b is made of a conductive plastic containing a carbon material in many cases. Therefore, use of a carbon material as the electrically conductive material of the cushion member 12 is effective in setting the corrosion potential difference between the cushion member 12 and the end bipolar plate 11b to 0.35 V or less.

The thickness of the cushion member 12 is preferably 1 to 5,000 µm, and particularly preferably 5 to 100 µm. When the thickness is 1 µm or more, the electrical connection area between the end bipolar plate 11b and the current collector plate 10 can be increased even under a negative pressure.

On the other hand, when the thickness is 5,000 µm or less, the electrical connection between the current collector plate 10 and the end bipolar plate 11b can be sufficiently secured.

[Material Selection for Current Collector Plate Covering Layer and Cushion Member]

The material for the current collector plate covering layer 10s and the material for the cushion member 12 are selected such that the corrosion potential difference between the two members 10s and 12 is 0.35 V or less. For example, when the current collector plate covering layer 10s is composed of a carbon material, the corrosion potential difference between the current collector plate covering layer 10s and the cushion member 12 can be set to substantially 0 V. In this case, the current collector plate covering layer 10s composed of a carbon material is preferably formed using plating or a gas phase method.

[Advantages]

In the battery cell stack 3 described above, even when water enters the spaces between the current collector plate 10 and the cushion member 12 and between the cushion member 12 and the end bipolar plate 11b from the outside environment, electrolytic corrosion is unlikely to occur therebetween. In particular, in the case where the current collector plate covering layer 10s and the cushion member 12 are each made of a carbon material, it is possible to substantially avoid the occurrence of electrolytic corrosion.

Furthermore, in the configuration of the battery cell stack 3, it is also possible to suppress an increase in the electrical resistance value between the current collector plate 10 and the end bipolar plate 11b due to repeated charging and discharging. The reason for this is that the corrosion potential difference between the current collector plate 10 and the cushion member 12 and the corrosion potential difference between the cushion member 12 and the end bipolar plate 11b are each 0.35 V or less, and electrolytic corrosion, which may cause an increase in the electrical resistance value, is unlikely to occur between the current collector plate 10 and the end bipolar plate 11b.

Embodiment 1-3

In Embodiment 1-1, the corrosion potential difference between the members 10 and 11b may be set to 0.35 V or less, without forming the covering layers 10s and 11s, only by selection of materials for the current collector plate 10 and the end bipolar plate 11b. Furthermore, in Embodiment 2, the corrosion potential difference between the members 10 and 12 may be set to 0.35 V or less, without forming the current collector plate covering layer 10s, only by selection of materials for the current collector plate 10 and the cushion member 12.

Embodiment 2-1

Figure 3:
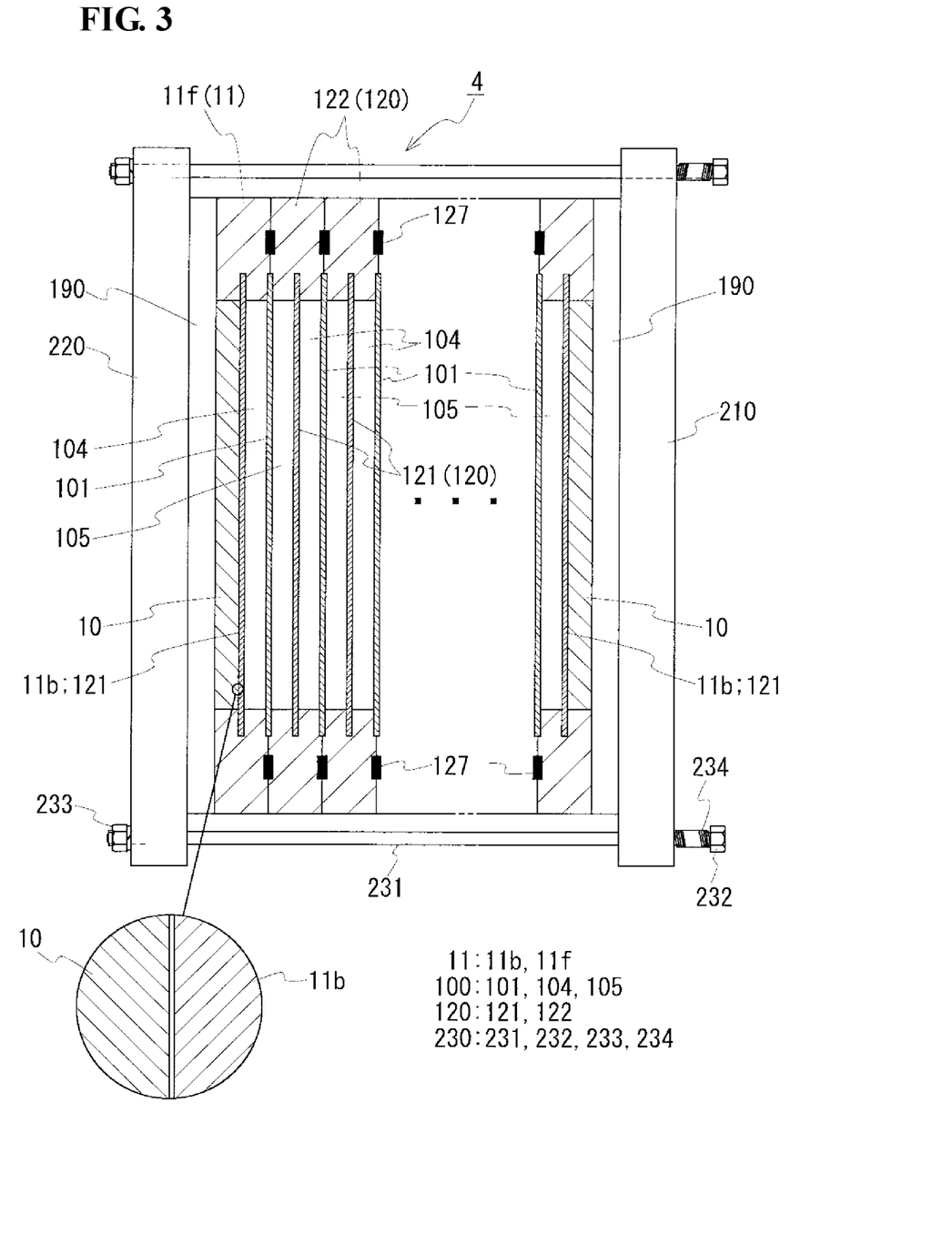
FIG. 3 is a schematic diagram of a battery cell stack according to Embodiment 2-1.

In Embodiment 2-1, a description will be made on a battery cell stack 4, in which the corrosion potential difference between a current collector plate 10 and an end bipolar plate 11b is 0.45 to 0.55 V, with reference to FIG. 3.

[Current Collector Plate]

The current collector plate 10 included in the battery cell stack 4 can be made of the material exemplified in the description of the current collector plate 10 in Embodiment 1-1, for example, gold, silver, copper, iron, nickel, chromium, tin, aluminum, titanium, or an alloy containing any of these elements as a major component. However, the material cannot be selected regardless of the material for the end bipolar plate 11b. A detailed description will be made in the section titled "Material selection for current collector plate and end bipolar plate".

[End Bipolar Plate]

The end bipolar plate 11b included in the battery cell stack 4 can be also made of the material exemplified in the description of the end bipolar plate 11b in Embodiment 1-1, for example, a conductive plastic containing a carbon material, or the like. The end bipolar plate 11b and the current collector plate 10 described above each do not have a covering layer as shown in an enlarged view surrounded by a circle in the bottom left of FIG. 3.

[Material Selection for Current Collector Plate and End Bipolar Plate]

The material for the current collector plate 10 and the material for the end bipolar plate 11b are selected such that the corrosion potential difference between the two members 10 and 11b is 0.45 to 0.55 V. The end bipolar plate 11b is generally made of a conductive plastic containing a carbon material, and therefore, it would be desirable to select the material for the current collector plate 10 in accordance with the potential of the carbon material in artificial seawater. Referring to the galvanic series in artificial seawater shown in "Material selection for current collector plate covering layer and bipolar plate covering layer" of Embodiment 1-1, since the potential of a carbon material in artificial seawater is about 0.26 V to about 0.32 V, the current collector plate 10 may be made of a material whose potential in artificial seawater is about −0.29 to −0.13 V, such as copper or a copper alloy. Furthermore, regarding nickel, silver, titanium, alloys containing these elements, stainless steel, and the like, the potential in artificial seawater is about −0.2 V.

[Advantages]

In the battery cell stack 4 described above, electrolytic corrosion occurs between the current collector plate 10 and the end bipolar plate 11b which have a large difference in corrosion potential. Although the reason is uncertain, the electrolytic corrosion portion does not substantially increase the electrical resistance value between the current collector plate 10 and the end bipolar plate 11b. In fact, in the case where the accelerated test shown under the section of "Advantages" in Embodiment 1-1 is conducted using the battery cell stack 4, the rate of increase of the electrical resistance value between the current collector plate 10 and the end bipolar plate 11b is 5% or less. In an RF battery using such a battery cell stack 4, the performance is unlikely to be degraded by repeated charging and discharging.

Embodiment 2-2

A description will be made on a battery cell stack 5, which includes, in addition to the configuration of Embodiment 2-1, a cushion member 12 disposed between the current collector plate 10 and the end bipolar plate 11b, with reference to FIG. 4.

[Cushion Member]

The cushion member 12 included in the battery cell stack 5 can be made of the material exemplified in the description of the cushion member 12 in Embodiment 1-2, for example, a mesh, a foil, or a felt containing a carbon material. The end bipolar plate 11b is made of a conductive plastic containing a carbon material in many cases. Therefore, when the cushion member 12 is made of a carbon material, the corrosion potential difference between the cushion member 12 and the end bipolar plate 11b can be set to substantially 0 V.

[Material Selection for Current Collector Plate]

In relation to the cushion member 12, the current collector plate 10 is made of a material such that the corrosion potential difference between the current collector plate 10 and the cushion member 12 is 0.45 to 0.55 V. For example, the current collector plate 10 may be made of copper or a copper alloy whose potential in artificial seawater is about −0.2 V. Furthermore, regarding nickel, silver, titanium, alloys containing these elements, stainless steel, and the like, the potential in artificial seawater is about −0.2 V.

[Advantages]

In the battery cell stack 5 described above, although electrolytic corrosion does not occur between the cushion member 12 and the end bipolar plate 11b which have a corrosion potential difference of substantially 0 V, electrolytic corrosion occurs between the current collector plate 10 and the cushion member 12 which have a large difference in corrosion potential. However, the electrolytic corrosion portion does not substantially increase the electrical resistance value between the current collector plate 10 and the end bipolar plate 11b. In fact, in the case where the accelerated test shown under the section of "Advantages" in Embodiment 1-1 is conducted using the battery cell stack 5, the rate of increase of the electrical resistance value between the current collector plate 10 and the end bipolar plate 11b is 5% or less. In an RF battery using such a battery cell stack 5, the performance is unlikely to be degraded by repeated charging and discharging.

EXPERIMENTAL EXAMPLE 1

In Experimental Example 1, battery cell stacks of the embodiment type and a battery cell stack of the existing type were fabricated, and an accelerated test simulating the operation condition of an RF battery was performed on the individual battery cell stacks. The battery cell stacks are configured as described below.

<<Embodiment Type I>>

Figure 1:
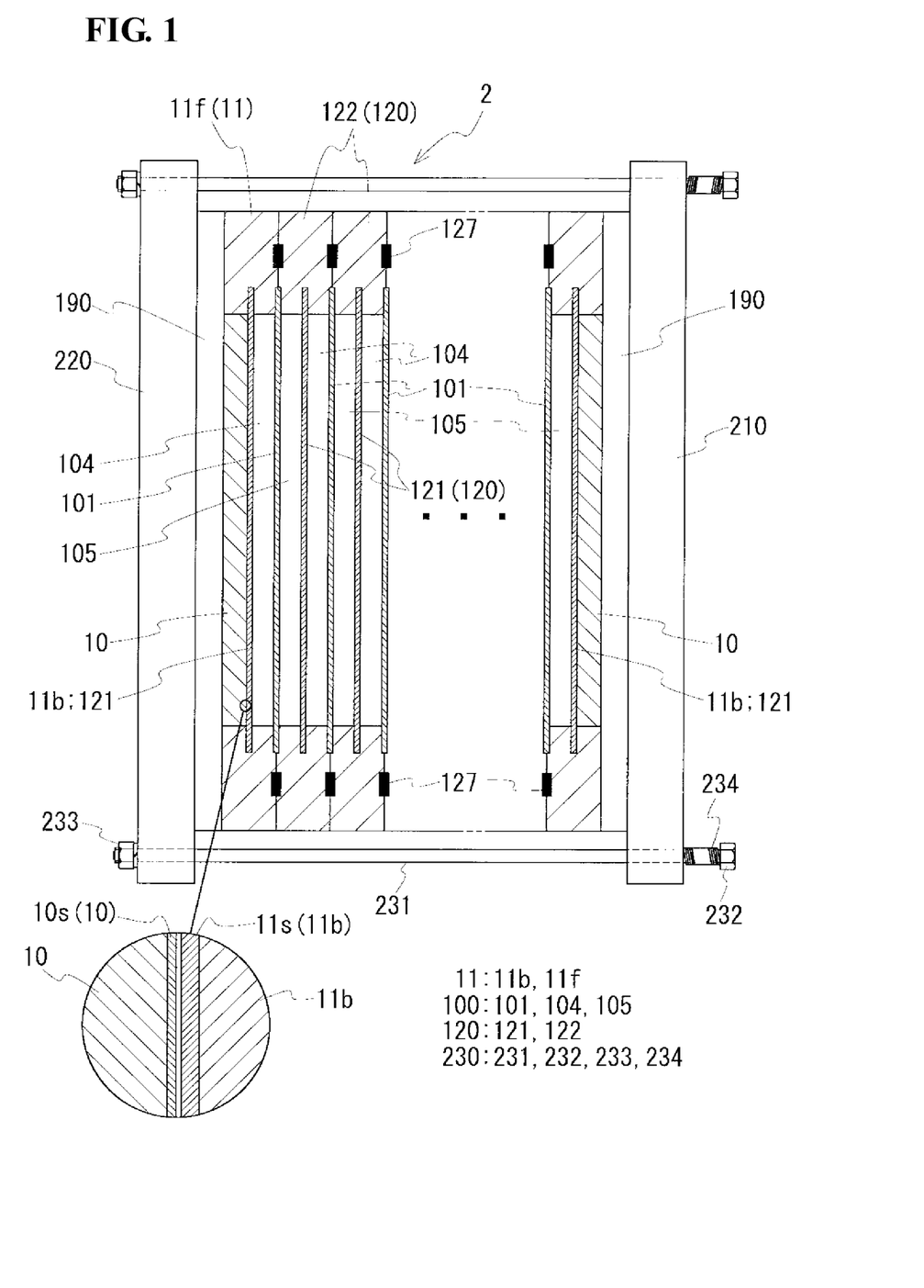
FIG. 1 is a schematic diagram of a battery cell stack according to Embodiment 1-1.

A battery cell stack of the embodiment type I is a test cell stack having a single-cell structure in which the structure of a current collector plate 10 and an end bipolar plate 11b is the same as that of the battery cell stack 2 shown in FIG. 1. The single-cell structure refers to a structure in which a positive electrode 104 and a negative electrode 105 are sandwiched between a pair of end cell frames 11 (without interposing a membrane 101), and the end cell frames 11 are fastened with end plates 210 and 220. The end frames 11 are sealed with a sealing structure disposed therebetween. In the battery cell stack of the embodiment type I, the current collector plate 10 was a copper plate, the end bipolar plate 11b was a conductive plastic plate containing a carbon material, the current collector plate covering layer 10s was a tin plating layer, and the bipolar plate covering layer 11s was a tin thermal spraying layer.

<<Embodiment Type II>>

Figure 4:
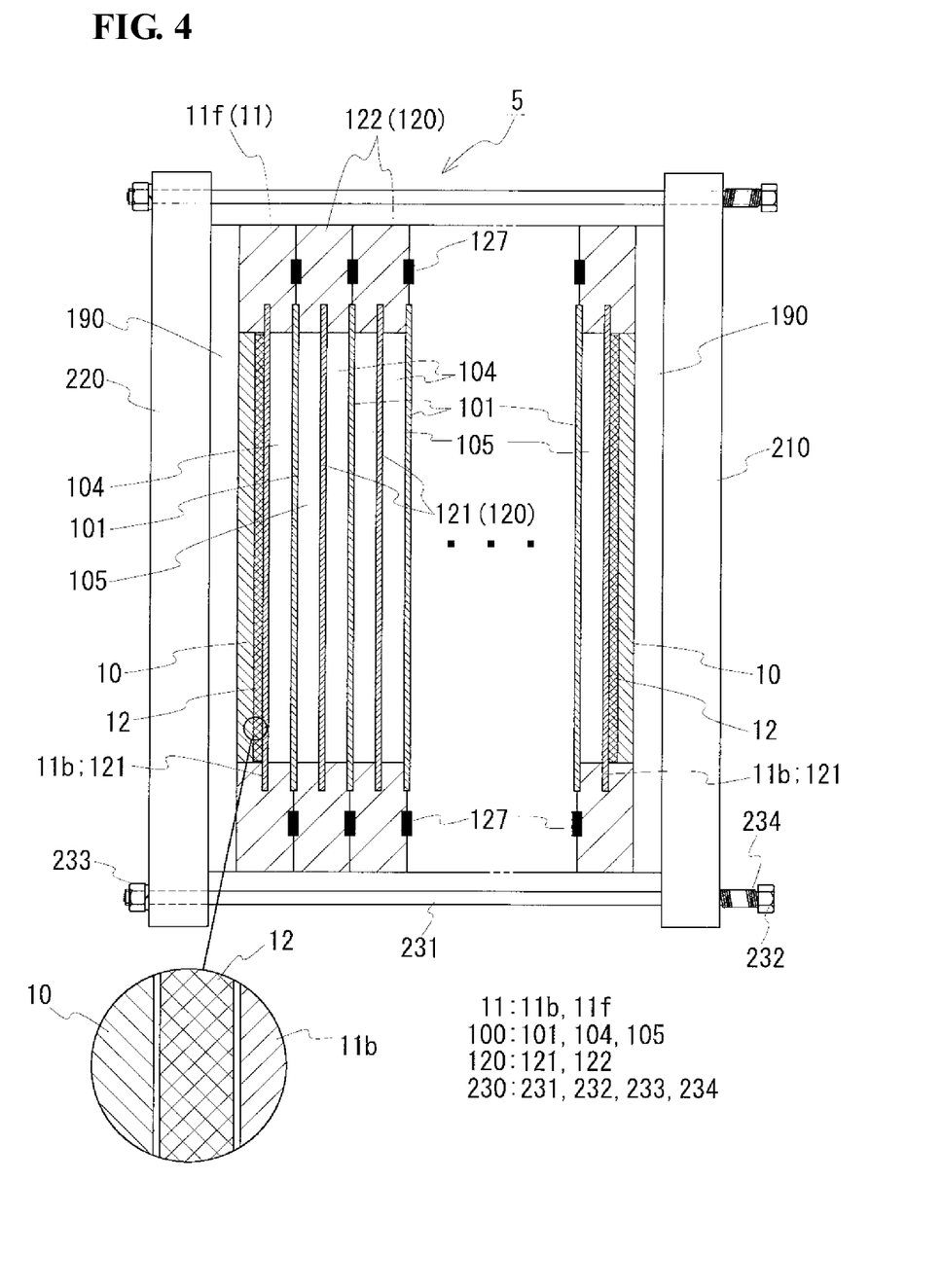
FIG. 4 is a schematic diagram of a battery cell stack according to Embodiment 2-2.

A battery cell stack of the embodiment type II is a test cell stack having a single-cell structure in which a cushion member 12 is disposed between a current collector plate 10 and an end bipolar plate 11b as in the battery cell stack 5 shown in FIG. 4. In the battery cell stack of the embodiment type II, the current collector plate 10 was a copper plate, the end bipolar plate 11b (and the intermediate bipolar plate 121) were each a conductive plastic plate containing carbon, and the cushion member 12 was made of a carbon felt. The current collector plate 10 and the end bipolar plate 11b each did not have a covering layer.

<<Existing Type>>

Figure 2:
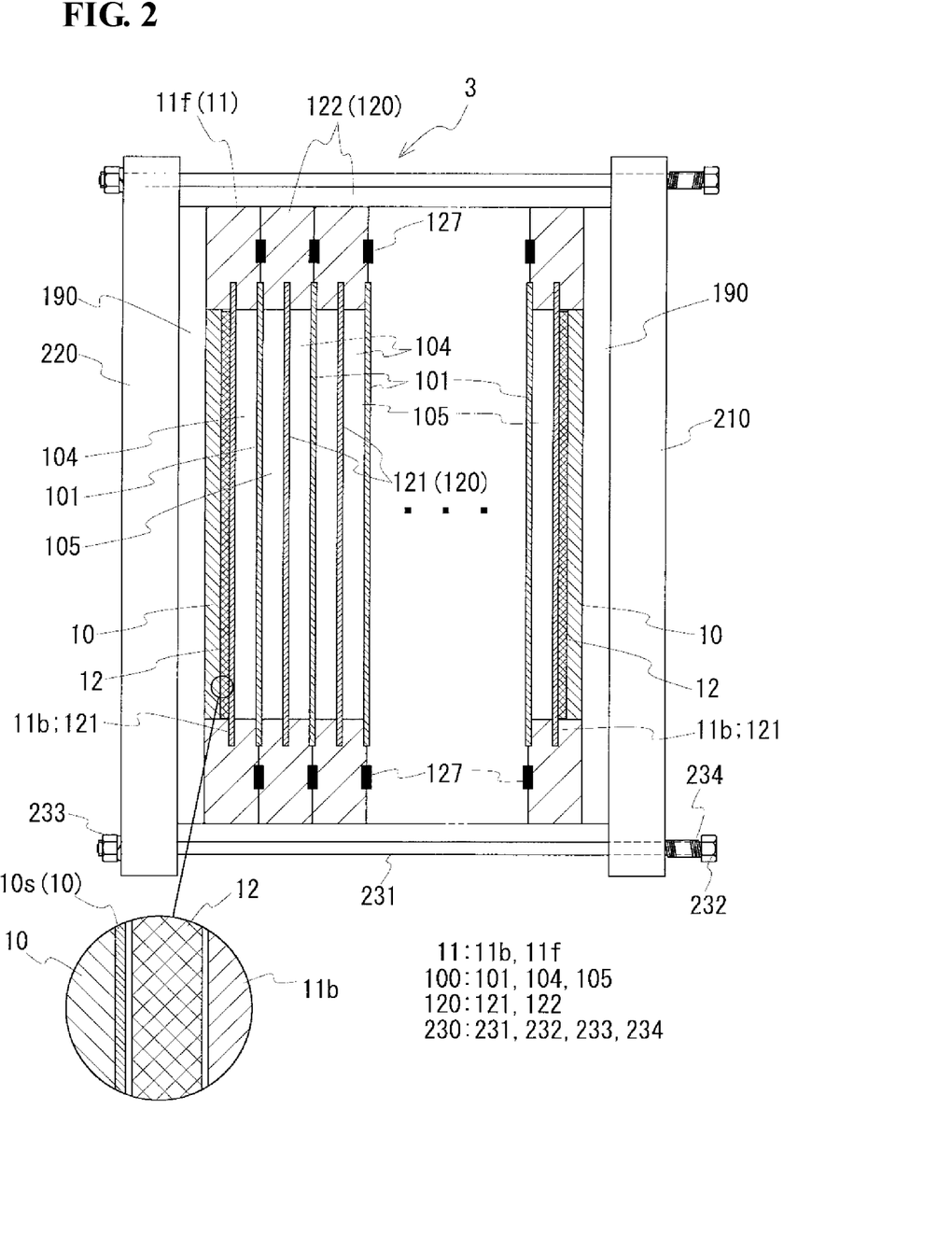
FIG. 2 is a schematic diagram of a battery cell stack according to Embodiment 1-2.

A battery cell stack of the existing type is a test cell stack having a structure similar to that of the battery cell stack 3 shown in FIG. 2, i.e., having a single-cell structure in which a cushion member 12 is disposed between a current collector plate 10 and an end bipolar plate 11b. However, in the battery cell stack of the existing type, the current collector plate 10 was a copper plate, the end bipolar plate 11b (intermediate bipolar plate 121) was a conductive plastic plate containing carbon, the cushion member 12 was made of a carbon felt, the current collector plate covering layer 10s of the current collector plate 10 was a tin plating layer, and a tin thermal spraying layer was disposed on the surface of the end bipolar plate 11b.

<<Accelerated Test>>

Nitrogen gas was fed into a flow channel for the electrolyte of each of the battery cell stacks having the configuration described above, and application of pressure with nitrogen gas to the inside of the battery cell stack and reduction in pressure from the pressurized state to the atmospheric pressure were alternately repeated. Thus, circulation and non-circulation of the electrolyte to the battery cell stack (i.e., the operation condition of an RF battery) were simulated. Specifically, a cycle included applying pressure over one minute to achieve the atmospheric pressure plus 0.1 MPa, maintaining the pressure for one minute, and bringing the pressure back to the atmospheric pressure over one minute, and this cycle was repeated 18 times. Furthermore, at the end of each cycle, the electrical resistance per unit area between the current collector plate 10 and the end bipolar plate 11b (hereinafter referred to as the "end resistance") was measured. The end resistance was obtained by connecting a terminal to each of the current collector plate 10 and the end bipolar plate 11b, and measuring the resistance between the two terminals. The results of the accelerated test are shown in a graph of FIG. 5.

Figure 5:
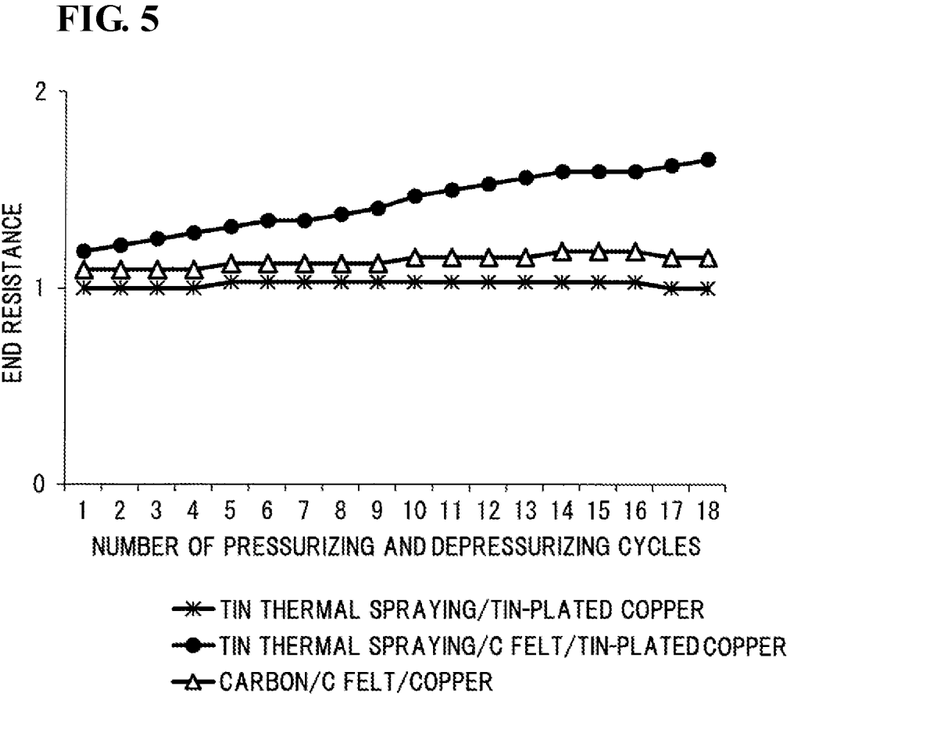
FIG. 5 is a graph showing the test results of the accelerated test shown in Experimental Example 1.

In the graph of FIG. 5, the horizontal axis represents the number of pressurizing and depressurizing cycles, and the vertical axis represents the end resistance. The "*" mark represents the end resistance value of the battery cell stack of the embodiment type I, the blank triangle mark represents the end resistance value of the battery cell stack of the embodiment type II, and the black circle mark represents the end resistance value of the battery cell stack of the existing type. Note that, regarding the end resistance in FIG. 5, the end resistance of the battery cell stack of the embodiment type I before the start of the accelerated test is shown as "1"

<<Results>>

The results of the accelerated test showed that in the battery cell stacks of the embodiment type I and type II, even when pressurizing and depressurizing were repeated, the end resistance value did not substantially increase. Specifically, before and after the accelerated test, the rate of increase in the end resistance value was 5% or less, and in particular, in the battery cell stack of the embodiment type I, the rate of increase in the end resistance value was negative (the end resistance value after the accelerated test was lower than that before the accelerated test). In contrast, in the battery cell stack of the existing type, the end resistance value tended to increase as pressurizing and depressurizing were repeated, and the rate of increase in the end resistance value was 20% or more before and after the accelerated test. Following such results, the battery cell stacks were disassembled, and it was confirmed that, in the battery cell stack of the embodiment type I, electrolytic corrosion did not occur in either of the current collector plate 10 and the end bipolar plate 11b. On the other hand, in the battery cell stack of the embodiment type II and the battery cell stack of the existing type, it was confirmed that electrolytic corrosion occurred in the current collector plate 10.

The test results of the embodiment type I show that when the corrosion potential difference between the current collector plate 10 and the end bipolar plate 11b is 0.35 V or less, electrolytic corrosion in the vicinity of the current collector plate 10 can be effectively suppressed, and consequently, it is possible to suppress degradation of the performance of the RF battery due to repeated charging and discharging.

Furthermore, the test results of the embodiment type II show that when the corrosion potential difference between the current collector plate 10 and the end bipolar plate 11b (to be precise, between the current collector plate 10 and the cushion member 12) is 0.45 to 0.55 V, although electrolytic corrosion occurs in the vicinity of the current collector plate 10, the end resistance value does not substantially increase.

INDUSTRIAL APPLICABILITY

The battery cell stacks according to the present invention can be suitably used for producing RF batteries. In addition, the battery cell stacks according to the present invention can also be used for producing other batteries, such as fuel cells and lead storage batteries. Furthermore, the RF batteries according to the present invention can be used as storage batteries for new energy power generation, such as solar power generation or wind power generation, for the purpose of stabilizing variation of power output, storing generated power during oversupply, leveling load, and the like, and also can be provided in a general power plant and used as large-capacity storage batteries as countermeasures against voltage sag/power failure and for the purpose of leveling load.

REFERENCE SIGNS LIST 1 redox flow battery (RF battery)
2, 3, 4, 5 battery cell stack
10 current collector plate
10s current collector plate covering layer
11 end cell frame
11b end bipolar plate
11f frame
11s bipolar plate covering layer
12 cushion member
100 cell
101 membrane
102 positive electrode cell
103 negative electrode cell
104 positive electrode
105 negative electrode
106 positive electrode electrolyte tank
107 negative electrode electrolyte tank
108, 109, 110, 111 duct 112, 113 pump
120 cell frame
121 bipolar plate
122 frame
123, 124 liquid supply manifold
125, 126 liquid discharge manifold
127 sealing member
190 supply/discharge plate
210, 220 end plate
200 existing battery cell stack
200s sub-stack
230 fastening mechanism
231 fastening shaft
232, 233 nut
234 compression spring

The invention claimed is:

1. A battery cell stack comprising:
a plurality of stacked bipolar plates;
battery cells placed between the individual bipolar plates; and
a current collector plate electrically connected to each of a pair of end bipolar plates located at both ends in the stacking direction among the plurality of bipolar plates,
wherein two members in contact with each other between the current collector plate and the end bipolar plate are made of materials such that, when an accelerated test satisfying the following conditions 1 to 3 is performed, the electrical resistance value between the current collector plate and the end bipolar plate after the accelerated test is 1.05 times or less the electrical resistance value between the current collector plate and the end bipolar plate before the accelerated test:
Condition 1 is that a cycle includes applying pressure over one minute to achieve a predetermined pressure, maintaining the predetermined pressure for one minute, and bringing the predetermined pressure back to the atmospheric pressure over one minute;
Condition 2 is that the predetermined pressure is set to be the atmospheric pressure +0.1 MPa; and
Condition 3 is that the number of cycles is set to 18.

2. The battery cell stack according to claim 1, wherein the corrosion potential difference between any two members in contact with each other between the current collector plate and the end bipolar plate is 0.35 V or less.

3. The battery cell stack according to claim 2,
wherein the current collector plate is provided with a current collector plate covering layer formed on a portion of the surface thereof facing the end bipolar plate,
the end bipolar plate is provided with a bipolar plate covering layer formed on a portion of the surface thereof facing the current collector plate,
the current collector plate covering layer and the bipolar plate covering layer are made of materials such that the corrosion potential difference between the two covering layers is 0.35 V or less, and
the current collector plate and the end bipolar plate are in contact with each other with their respective covering layers therebetween.

4. The battery cell stack according to claim 3, wherein the current collector plate covering layer is a tin or tin alloy layer, and
the bipolar plate covering layer is a tin or tin alloy layer.

5. The battery cell stack according to claim 2, further comprising an electrically conductive cushion member which is disposed between and in contact with the current collector plate and the end bipolar plate,
wherein the cushion member is at least one selected from the group consisting of a mesh, a foil, and a felt made of a material such that the corrosion potential difference between the cushion member and the end bipolar plate is 0.35 V or less,
the current collector plate is provided with a current collector plate covering layer formed on a portion of the surface thereof facing the cushion member,
the current collector plate covering layer is made of a material such that the corrosion potential difference between the current collector plate covering layer and the cushion member is 0.35 V or less, and
the current collector plate and the cushion member is in contact with each other with the current collector plate covering layer therebetween.

6. The battery cell stack according to claim 5, wherein the cushion member contains a carbon material as an electrically conductive material, and
the current collector plate covering layer is a carbon material layer.

7. The battery cell stack according to claim 1, wherein the corrosion potential difference between the current collector plate and a member in contact with the current collector plate between the current collector plate and the end bipolar plate is 0.45 to 0.55 V.

8. The battery cell stack according to claim 7, wherein the current collector plate and the end bipolar plate is in direct contact with each other, and
the current collector plate and the end bipolar plate are made of materials such that the corrosion potential difference therebetween is 0.45 to 0.55 V.

9. The battery cell stack according to claim 8, wherein the current collector plate is made of nickel, a nickel alloy, copper, a copper alloy, silver, a silver alloy, titanium, a titanium alloy, or stainless steel.

10. The battery cell stack according to claim 7, further comprising an electrically conductive cushion member which is disposed between and in contact with the current collector plate and the end bipolar plate, the cushion member being composed of at least one selected from the group consisting of a mesh, a foil, and a felt,
wherein the current collector plate and the cushion member are made of materials such that the corrosion potential difference therebetween is 0.45 to 0.55 V.

11. The battery cell stack according to claim 10, wherein the current collector plate is made of nickel, a nickel alloy, copper, a copper alloy, silver, a silver alloy, titanium, a titanium alloy, or stainless steel.

12. A redox flow battery comprising:
the battery cell stack according to claim 1;
a positive electrode circulation mechanism which circulates a positive electrode electrolyte to the battery cell stack; and
a negative electrode circulation mechanism which circulates a negative electrode electrolyte to the battery cell stack.

* * * * *